(12) United States Patent
Bürgi et al.

(10) Patent No.: US 12,228,551 B2
(45) Date of Patent: Feb. 18, 2025

(54) PHOTOACOUSTIC GAS SENSOR DEVICE

(71) Applicant: SENSIRION AG, Stäfa (CH)

(72) Inventors: Lukas Bürgi, Stäfa (CH); Thomas Uehlinger, Stäfa (CH); Werner Hunziker, Zürich (CH)

(73) Assignee: SENSIRION AG, Stäfa (CH)

( * ) Notice: Subject to any disclaimer, the term of this patent is extended or adjusted under 35 U.S.C. 154(b) by 153 days.

(21) Appl. No.: 17/631,849

(22) PCT Filed: Jul. 30, 2020

(86) PCT No.: PCT/EP2020/071510
§ 371 (c)(1),
(2) Date: Jan. 31, 2022

(87) PCT Pub. No.: WO2021/028231
PCT Pub. Date: Feb. 18, 2021

(65) Prior Publication Data
US 2022/0283123 A1   Sep. 8, 2022

(30) Foreign Application Priority Data
Aug. 9, 2019   (EP) ..................................... 19191110

(51) Int. Cl.
*G01N 29/32*   (2006.01)
*G01N 29/22*   (2006.01)
(Continued)

(52) U.S. Cl.
CPC ........... *G01N 29/32* (2013.01); *G01N 29/222* (2013.01); *G01N 29/2425* (2013.01);
(Continued)

(58) Field of Classification Search
CPC .. G01N 29/32; G01N 29/222; G01N 29/2425; G01N 29/42; G01N 29/2418;
(Continued)

(56) References Cited

U.S. PATENT DOCUMENTS

| | | |
|---|---|---|
| 6,006,585 A | 12/1999 | Forster |
| 10,241,088 B2 | 3/2019 | Theuss et al. |
| (Continued) | | |

FOREIGN PATENT DOCUMENTS

| | | |
|---|---|---|
| EP | 2392916 | 12/2011 |
| JP | H09127066 A | 5/1997 |

OTHER PUBLICATIONS

International Search Report and Written Opinion for PCT Patent Application No. PCT/EP2020/071510, filed Jul. 30, 2020, mailed on Oct. 14, 2020, European Patent Office, 10 pages.
(Continued)

*Primary Examiner* — Suman K Nath
(74) *Attorney, Agent, or Firm* — Mannava & Kang, P.C.

(57) ABSTRACT

A photoacoustic gas sensor device for determining a value indicative of a presence or a concentration of a component in a gas comprises a measurement cell enclosing a measurement volume and a gas permeable area in the measurement cell for a gas to enter the measurement volume. An electromagnetic radiation source is arranged to emit electromagnetic radiation into the measurement volume, and a pressure transducer is arranged to measure a sound wave generated by the component in response to an absorption of electromagnetic radiation by the component in the measurement volume. In one aspect, the gas permeable area is represented by a porous gas permeable membrane with an average pore size of the porous gas permeable membrane between 10 nm and 1 µm. In another aspect the gas permeable area is represented by an area of the measurement cell containing holes reaching through an otherwise gas tight material of the measurement cell, with a diameter of the holes between 100 nm and 10 µm.

20 Claims, 9 Drawing Sheets

(51) Int. Cl.
*G01N 29/24* (2006.01)
*G01N 29/42* (2006.01)

(52) U.S. Cl.
CPC ....... *G01N 29/42* (2013.01); *G01N 2291/021* (2013.01); *G01N 2291/02809* (2013.01)

(58) Field of Classification Search
CPC ... G01N 2291/021; G01N 2291/02809; G01N 2021/1704; G01N 21/031; G01N 21/1702; G01N 21/3504; G01N 2201/0221; G01N 33/004
See application file for complete search history.

(56) References Cited

U.S. PATENT DOCUMENTS

| | | | |
|---|---|---|---|
| 2011/0296900 A1* | 12/2011 | Thorson | G01N 21/1702 73/24.02 |
| 2012/0055232 A1* | 3/2012 | Thorson | G01N 21/1702 73/24.02 |
| 2016/0313291 A1 | 10/2016 | Johansen | |
| 2017/0350810 A1 | 12/2017 | Tumpold et al. | |

OTHER PUBLICATIONS

Machine English translation of "Reasons for Refusal for Japanese application No. 2022-508539" Apr. 23, 2024, 6 pages.

* cited by examiner

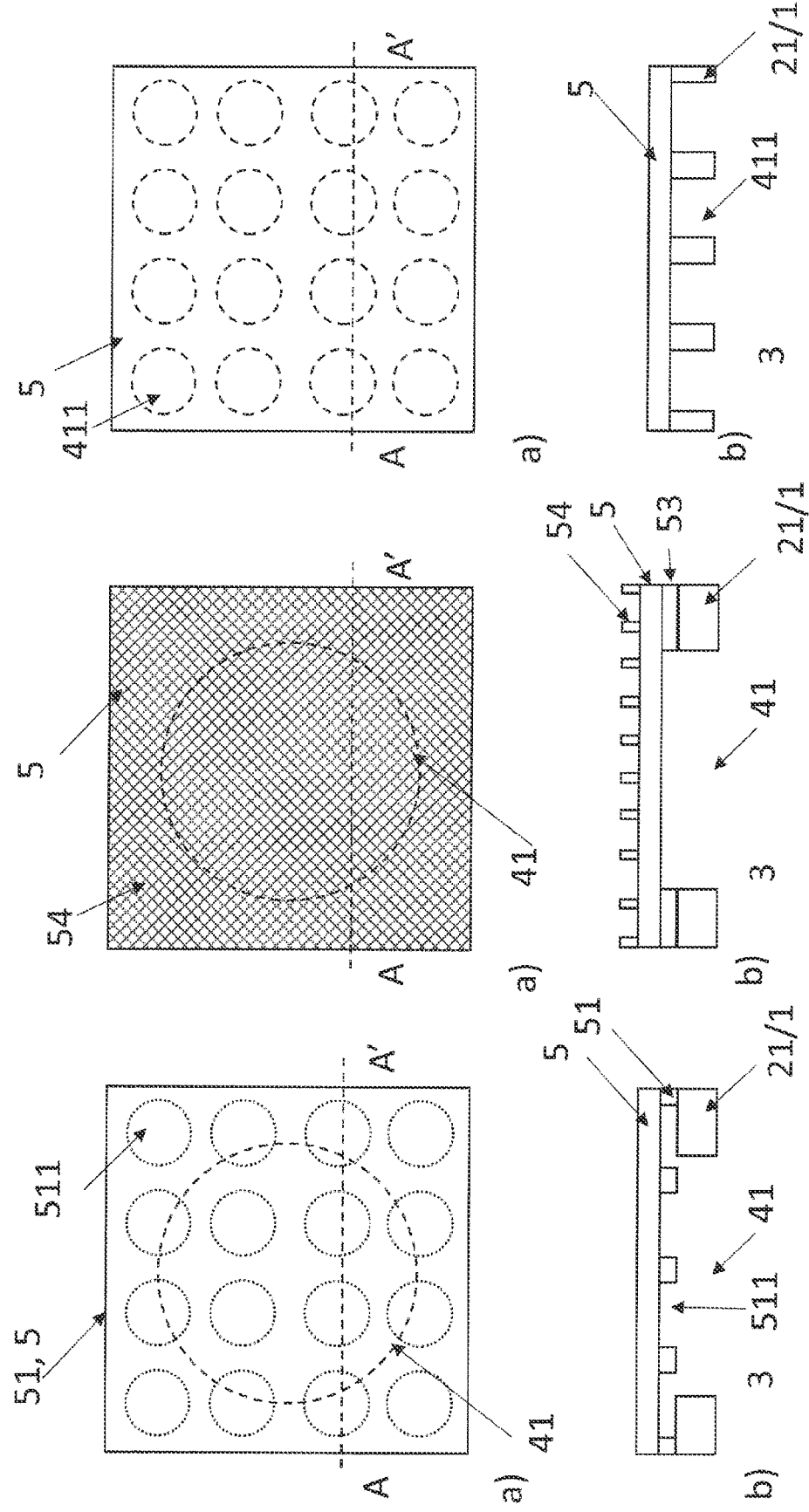

PHOTOACOUSTIC GAS SENSOR DEVICE

CLAIM FOR PRIORITY

The present application is a national stage filing under 35 U.S.C 371 of PCT application number PCT/EP2020/071510, having an international filing date of Jul. 30, 2020, which claims priority to European patent application number 19191110.6 having a filing date of Aug. 9, 2019, the disclosures of which are hereby incorporated by reference in their entireties.

TECHNICAL FIELD

The present invention relates to photoacoustic gas sensor devices configured to determine a value indicative of a presence or a concentration of a component, in particular of $CO_2$, in a gas.

BACKGROUND ART

Photoacoustic gas sensors rely on the physical effect that e.g. infrared radiation is absorbed by molecules of a component of interest in a gas, e.g. $CO_2$, thereby transferring the molecules to an excited state. Subsequently heat is generated due to non-radiative decay of the excited state, e.g. by collisions of the molecules, which leads to an increase of pressure. Through modulating the infrared radiation to be absorbed with a modulation frequency, the pressure varies at the modulation frequency. Such pressure variation may be measured by a pressure transducer. The concentration of the component is proportional to an amplitude of the pressure variation.

The measurement cell requires a gas permeable area for the target gas to enter the measurement cell. Such gas permeable area is desired to fulfil disparate requirements: It is desired that the gas permeable area allows a sufficient exchange of the target gas between an exterior of the measurement cell which is the surroundings and an interior also referred to as measurement volume. On the other hand, pressure variations inside the measurement cell resulting from the photoacoustic effect and representing temporary excess pressures are desired not to escape through the gas permeable area otherwise leading to a less significant signal detected by the pressure transducer. At the same time, it is desired that pressure variations outside the measurement cell, such as ambient noise, do not migrate into the measurement cell thereby disturbing and falsifying the photoacoustic effect evoked by the component in the target gas.

It is hence an object of the present invention to provide a photoacoustic gas sensor device with a gas permeable area that at best meets these divergent conditions.

Disclosure of the Invention

The object is achieved by a photoacoustic gas sensor device according to a first aspect and a second aspect of the present invention as claimed in independent claims 1 and 12.

The photoacoustic gas sensor device for determining a value indicative of a presence or a concentration of a component in a gas comprises a measurement cell enclosing a measurement volume. The device further comprises an electromagnetic radiation source for emitting electromagnetic radiation into the measurement volume, and a pressure transducer arranged to measure a sound wave generated by the component in response to an absorption of electromagnetic radiation by the component in the measurement volume. Preferably, the electromagnetic radiation source and the pressure transducer are arranged in the measurement cell. Hence, photoacoustic reactions inside the measurement cell are evoked by an irradiation of the gas present in the measurement volume and are measured by the pressure transducer.

The photoacoustic effect is based on the mechanism that molecules of a gas component of interest, e.g. $CO_2$, absorb electromagnetic radiation, in one example infrared radiation. The absorption leads to a generation of heat due to non-radiative decay, e.g. by collisions between the molecules of the gas component of and/or by collisions of the molecules of the gas component with different molecules, which in turn leads to an increase of pressure in the measurement volume. By modulating an intensity of the electromagnetic radiation with a modulation frequency, a modulation of pressure is achieved. Such pressure modulation represented by pressure variations, i.e. sound waves, may be measured by the pressure transducer. The value indicative of a presence or a concentration of the component, i.e. the component's concentration, may then be determined dependent on an amplitude of the pressure variations. The amplitude may be assumed to be proportional to an amount of electromagnetic radiation absorbed by the component, and hence proportional to the component's concentration in the gas if all other factors, e.g. a mean optical path length in the measurement volume, stay equal.

For allowing the gas to be investigated to enter the measurement cell, a gas permeable area is provided in the measurement cell while other portions of the measurement cell are preferably embodied gas tight.

According to the first aspect as claimed in claim 1, the gas permeable area is represented by a porous gas permeable membrane. Accordingly, the gas permeable membrane comprises pores resulting from a property of a membrane material, or resulting from a manufacturing process. Preferably, the porous gas permeable membrane is attached to the measurement cell and covers an opening in the measurement cell.

An average pore size of the porous gas permeable membrane is between 10 nm and 1 μm, preferably between 20 nm and 200 nm. Preferably, a porosity of the porous gas permeable membrane is between 20% and 90%, in particular between 20% and 50%. In summary, the air permeability, which in particular results from the average pore size, porosity and a pore structure, is preferably low, in particular between 0.03 $1/(hr\ cm^2)$ and 2 $1/(hr\ cm^2)$, preferably between 0.03 $1/(hr\ cm^2)$ and 0.4 $1/(hr\ cm^2)$, for a differential pressure of 10 mbar. A small pore size and low porosity, in particular in connection with the specific pore structure, leads to such low air permeability and to desired attenuation properties. Also, a low porosity leads to a membrane that is mechanically stable, and it avoids flexion of the membrane.

In order to meet the divergent objectives, it was found that the following dimensioning of parameters improves an attenuation property of the porous gas permeable membrane: A rather large measurement volume, a thick membrane, a small number of pores and small pore sizes. Exactly an opposite dimensioning of the parameters supports small diffusion times: A rather small measurement volume, a thin membrane, a large number of pores and large pore sizes. However, it was also found that the attenuation characteristic of a porous gas permeable membrane scales strongly nonlinear with the membrane's pore size, whereas diffusion time scales linear with the membrane's pore size. In particular, for decreasing pore sizes the attenuation increases strongly nonlinear. This leads to the finding that a membrane material is preferred comprising multiple small sized pores over a membrane material with less but larger sized pores. This approach promises a sufficient attenuation of noise from the outside. At the same time the porous gas permeable membrane attenuates photoacoustic pressure changes inside the measurement cell from migrating through the porous gas permeable membrane, while a time constant for diffusion of the gas into the measurement volume—also referred to as response time or the sensor—is rather short. Hence, by means of applying the above average pore size achievements in the divergent requirements of the gas permeable area are maximized.

The attenuation property is desired to mainly affect high frequency pressure variations since the pressure variations resulting from the photoacoustic effect occur in a certain frequency range or at a given frequency. At least, the attenuation property is desired to apply to this frequency range. The frequency range to be attenuated at least exceeds the frequency of pressure variations responsible for an exchange of the gaseous medium in the measurement volume. The first rather is in the Hz and KHz range while latter rather is in the sub-Hz range. In this context, a porous gas permeable membrane with the average pore size as suggested acts as low pass filter for pressure variations. Slow pressure variations evoking an exchange of gas in the measurement cell can pass the porous gas permeable membrane in view of the specifically designed average pore size, while pressure variations at a higher frequency are attenuated or blocked by the porous gas permeable membrane. Hence, higher frequency sounds evoked by the photoacoustic effect are damped or blocked from escaping through the porous gas permeable membrane from the measurement volume to the outside. On the other hand, the low pass filter characteristic of the porous gas permeable membrane also attenuates or blocks such higher frequency pressure variations from passing from the outside into the measurement volume. Hence, noise of a frequency range that otherwise would impact the measurement inside the measurement volume is also attenuated by the porous gas permeable membrane. Hence the pressure transducer signal remains unaffected by such external noise to a large extent even if in the relevant frequency spectrum. In one embodiment, the strong attenuation of higher frequency pressure variations may be sufficient when limited to the relevant frequency range since a signal supplied by the pressure transducer preferably is filtered anyway by a narrow bandpass filter around the relevant frequency.

Summarizing, the porous gas permeable membrane advantageously acts as a decoupling element between the measurement volume and the surroundings of the measurement cell. Sound waves in the relevant frequency range of the photoacoustic emissions inside the measurement cell as a result of a stimulation of the target gas components by the electromagnetic radiation are attenuated or blocked by the porous gas permeable membrane and as such prevented from leaving the measurement volume, while noise from the surroundings is attenuated or blocked by the porous gas permeable membrane from entering the measurement volume.

By means of the porous gas permeable membrane, a controllable vent arranged in the measurement cell, such as a valve, can be avoided which is desired given that a valve requires considerable space and an active control.

Preferably, the porous gas permeable membrane comprises or is made from one of sintered metal, ceramic, polymer. Preferably a material comprising or consisting of PTFE is used for the membrane. Such material comprises pores in the desired range, and in particular a porosity in the desired range. Such material is obtained either by expanding a thin sheet of material or by e.g. a sintering or a molding process of originally granular material, or by any other means of obtaining a porous material. In particular in the case of PTFE, the membrane is highly temperature resistant which allows reflow soldering the membrane to the measurement cell and/or reflow soldering of the whole device.

A dimension of the measurement volume preferably is between 0.03 cm$^3$ and 8 cm$^3$, preferably between 0.08 cm$^3$ and 1 cm$^3$, and preferably is 0.2 cm$^3$. These dimensions are preferred for providing a small sized sensor also applicable in portable applications and/or saving space in a measurement device.

In an embodiment with a circular gas permeable area, a diameter of the gas permeable area preferably is between 0.2 mm and 4 mm, preferably between 0.5 mm and 2 mm. In a different embodiment with a non-circular gas permeable area, a size of the gas permeable area is preferably in the same range. This dimension is owed to the overall measurement volume in combination with preventing the membrane to buckle or flex which may impact the measurement result. In addition, it has the advantage that a sufficient area of the porous material is exposed.

A thickness of the membrane preferably is between 50 μm and 400 μm, preferably between 100 μm and 300 μm. Again, the thickness affects both, the diffusion time as well as the attenuation, and is chosen in combination with the preferred average pore size.

Preferably, a target time constant for diffusion is less than 100 s, and preferably less than 70 s. A preferred time constant representing the attenuation, in particular the attenuation of sound waves, preferably is more than $10^{-2}$ s.

Preferably, the measurement cell at least comprises a substrate and a measurement cell body, e.g. in shape of a cap, which preferably is attached to the preferably planar substrate. At least these components contribute to the measurement cell defining the measurement volume as its interior.

Preferably, the substrate is a printed circuit board (PCB), e.g. made from FR4. In a different embodiment, the substrate is made from a ceramic material which provides more mechanical stability. In a further embodiment, the substrate is part of a System in Package (SiP), or is an SiP substrate. The electromagnetic radiation source and the pressure transducer preferably are arranged on a front side of the substrate facing the measurement volume and hence are arranged in the measurement cell.

As to the measurement cell body, it is preferred that at least a major portion, i.e. at least 50%, of its inner surface facing the measurement volume is made of a reflective material. I.e., a portion of or the entire inner surface preferably is made from the reflective material, either by way of a reflective coating applied to a core of the measurement cell body, or by the measurement cell body being made of the reflective material. In the latter embodiment, the measurement cell body may be made from sheet metal, e.g. by deep drawing. Sheet metal has the advantages of being mechanically stable even at low thickness, and of showing a high reflectivity for electromagnetic radiation even without any further coating. In the earlier embodiment, a core of the measurement cell body is made of a non- or low-reflecting material, e.g. plastics, e.g. by injection molding, and a reflective coating is applied onto the inner surface. Generally, the or a reflective material preferably is metal, or is a metal-filled polymer, or is a metallized or mirrored glass, or is another material with a high reflectivity, in particular for the wavelength of the radiation emitted. The reflective material e.g. may be one or more of gold, aluminum, nickel and copper. These materials may in particular be used in case of a reflective coating being applied to a core.

As to the location of the porous gas permeable membrane in or at the measurement cell three preferred options are listed in the following:

In the first variant, the porous gas permeable membrane is arranged with respect to the measurement cell body. The measurement cell body comprises an opening defining the gas permeable area. The opening is covered by the porous gas permeable membrane. The porous gas permeable membrane preferably is attached to the measurement cell body, in particular by one of gluing, injecting, casting, soldering and welding. Accordingly, except for the opening covered by the porous gas permeable membrane all other components contributing to the measurement cell, i.e. the substrate and the rest of the measurement cell body, are preferably gas tight and are gas tight assembled such that the target gas may only enter the measurement volume through the gas permeable area. It is noted that preferably the porous gas permeable membrane exceeds a size of the opening in view of preferably being attached to the measurement cell body with its rim. The geometric shape of the porous gas permeable membrane may be different from the geometric shape of the opening, as long as the opening is completely covered by the porous gas permeable membrane when mounted. The porous gas permeable membrane may be attached to the measurement cell body from the inside, i.e. the porous gas permeable membrane is attached to the inner surface of the measurement cell body. In a different embodiment, the porous gas permeable membrane is attached to the measurement cell body from the outside, i.e. the porous gas permeable membrane is attached to the outer surface of the measurement cell body.

All these features and explanations are also applicable when the opening is provided in the substrate, according to a second variant. Given that electronic components such as the electromagnetic radiation source and the pressure transducer preferably are reflow soldered to the substrate, it is preferred that the porous gas permeable membrane when attached to the substrate is also reflow soldered in a common assembly step with the electronic components. For this purpose, it is preferred that the porous gas permeable membrane comprises a metallization e.g. at its rim, by which the porous gas permeable membrane is soldered to the substrate. In one embodiment, the opening may even be arranged underneath an electronic component sitting on the substrate in case sufficient venting is granted between the opening and the electric component, which venting preferably is effected by a distance there between.

In a third variant, the opening is provided between the substrate and the measurement cell body. Again, the opening is covered by the porous gas permeable membrane, wherein now the porous gas permeable membrane preferably is attached to both the measurement cell body and the substrate, in particular by one of gluing, injecting, casting, soldering and welding.

The following preferred embodiments aim at preventing the porous gas permeable membrane from bulging or flexing. A bulging of the porous gas permeable membrane may be evoked by pressure changes inside or outside of the porous gas permeable membrane. In case the pressure variations occur outside the porous gas permeable membrane its flexion not necessarily coincides with a diffusion of gas through the membrane. This may lead to a decrease of the photoacoustic signal detected by the pressure transducer. This drawback can be avoided or reduced in case of the porous gas permeable membrane being supported by support means holding the membrane in a stiff, plane position.

In a first embodiment thereof, a support layer is attached to the porous gas permeable membrane and acts as a mechanical support. In one variant, the support layer is an adhesive layer by means of which adhesive layer the porous gas permeable membrane is attached to the measurement cell. Hence, the function of the adhesive support layer is two-fold. It serves as attachment means for the porous gas permeable membrane, as well as its mechanical support after being hardened or annealed. In case the support layer is arranged between the membrane and the measurement cell and extends over the entire surface of the membrane, it is preferred that the support layer comprises one or more holes arranged to allow gas entering the measurement volume when passing the porous gas permeable membrane. As to the manufacturing, it is preferred that first the support layer is attached to the porous gas permeable membrane. Second, the support layer is structured while residing on the porous gas permeable membrane, e.g. for generating the one or more holes in the support layer but not in the porous gas permeable membrane. Third, the membrane—support layer combination is attached to the measurement cell body by means of the adhesive support layer such that the opening is covered. Finally, the adhesive support layer may be hardened or annealed. As a result, in this embodiment the support layer is arranged between the porous gas permeable membrane and the measurement cell/opening.

In a different embodiment, a support structure is arranged on the membrane and faces the surroundings of the sensor when mounted. Such support structure may in one embodiment by a lattice structure, e.g. made out of metal. Accordingly, the lattice structure first is attached to a first side the porous gas permeable membrane. Then the lattice structure—membrane combination is attached to the measurement cell by means of an adhesive attached to the side of the porous gas permeable membrane opposite the first side.

In a third embodiment, buckling of the porous gas permeable membrane is prevented by splitting the opening in the measurement cell into multiple bores of a diameter smaller than an envisaged single opening. The porous gas permeable membrane is attached to the measurement cell in the area with the multiple bores and covers all bores. Again, the porous gas permeable membrane may be attached to the measurement cell e.g. by an adhesive.

As described in one of the embodiments above, an inner surface of the measurement cell body is at least partly, but more preferably completely of a reflective material or a reflective coating. The gas permeable area represented by the opening covered by the porous gas permeable membrane typically is not of reflective property given that the material of the porous gas permeable membrane is not reflective. Hence, the gas permeable are constitutes a non-reflective area which leads to a decrease of the overall reflectivity of the measurement cell, thereby reducing the average optical path length and hence reducing the signal-to-noise ratio (SNR).

For this reason, a reflector may be provided for at least partly shielding the gas permeable area, which in turn increases the overall average reflectivity in the measurement cell. Such reflector preferably is arranged inside the measurement cell and is spaced from the opening and the membrane given that gas entering through the membrane is supposed to reach the measurement volume. The reflector reflects electromagnetic radiation back into the measurement volume otherwise absorbed by or transmitted through the porous gas permeable membrane.

According to a second aspect as claimed in claim 12, the gas permeable area of the photoacoustic gas sensor device is represented by an area of the measurement cell containing holes reaching through a wall of the measurement cell, instead of a membrane covering an opening. A diameter of the holes is between 100 nm and 10 μm. Hence, the measurement cell itself, i.e. its wall, is perforated by holes with the above specified diameter. In another embodiment of the second aspect, the holes are located in a small plate, i.e. the holes reach through the small plate. The small plate covers an opening in the measurement cell. The opening may again be located in one of the measurement cell body, the substrate or between the measurement cell body and the substrate, if applicable, as described in the context of the first aspect. Also further features of the membrane covering the opening in the first aspect, e.g. the size of the opening or the mounting of the membrane, may be applied to the small plate covering the opening.

It is noted that the diameter differs from the average pore size of the membrane referred to in the first aspect of the present invention. However, considerations and advantages of the second aspect of the invention are identical to the first aspect. Accordingly, all statements made in the context of the first aspect shall be considered as disclosed also in the context of the second aspect unless membrane specific.

For the second aspect, it is preferred that the number of holes is rather large while the diameter of the holes is rather small as laid out above. It is preferred that the number of holes is in a range between 50 and 200'000, preferably between 100 and 10'000.

It is noted that the holes may be provided in the measurement cell body and/or in the substrate. The holes may be arranged dense in an area comparable to the gas permeable area of a given diameter of the first aspect. Or, the holes may be arbitrarily distributed across the measurement cell.

Preferably, it is assumed that all holes are of uniform length and uniform diameter. Otherwise, average values are applied and are meant to fulfil the above range conditions. In one embodiment, a thickness of the measurement cell, i.e. its wall, defining the gas permeable area is between 1 μm and 1 mm and hence represents the average hole length.

For a high attenuation rather long holes with small diameters are preferred. A time constant characterizing an attenuation property for a hole is determined by $\tau = k*V*l\_c/r\_c^2$ wherein k is a constant, V is the measurement volume, $l\_c$ is the length of the hole and $r\_c$ is the radius of the hole. For diffusion through the holes, the time constant is $\tau = k*V*l\_c/r\_c^4$. For a swift diffusion of gas through the porous gas permeable membrane short holes with large hole diameters are preferred. Again, the selected range for the hole diameter is based on the insight that the attenuation factor increases faster with smaller diameter than the diffusion time decreases. In particular, the attenuation rises nonlinearly with smaller diameters, and diffusion decreases linearly. However, a determination of the length of the holes and also their diameters not only depends on diffusion and attenuation considerations but is also dependent on manufacturing limitations. Preferably, an aspect ratio of the hole diameter over the hole length is less than 20 for the reason of manufacturability.

Preferably, the holes are capillaries. Preferably, the holes are manufactured by etching e.g. into semiconducting material, or are manufactured by a laser or by ion bombardment.

The following embodiments are explicitly applicable to both aspects of the present invention.

Specifically, the pressure transducer may be a microphone, in particular a microphone that is sensitive to only a certain range of frequencies around the modulation frequency. In a different embodiment, the pressure transducer is a pressure sensor.

In a preferred embodiment, the electromagnetic radiation is infrared radiation. This means that the electromagnetic radiation source is an infrared radiation source configured to emit infrared radiation. Infrared radiation preferably is defined as radiation having a wavelength in a range between 700 nm and 1 mm. In another embodiment, the electromagnetic radiation source is a source for emitting radiation of a wavelength in a range between 100 nm and 700 nm. The electromagnetic radiation source may in one embodiment be a heater, in another embodiment be a laser, in a further embodiment be an LED. The heater may also be considered as a broadband radiation source, while the laser and the LED may be considered a narrow band radiation source. Preferably, the electromagnetic radiation emitted by the electromagnetic radiation source is only emitted in a band matching an absorption peak of the gas component of interest. A band is considered a subrange of the electromagnetic spectrum, preferably symmetrically around a wavelength representing the absorption peak, with a max/min band limit of +/− 15% of the wavelength representing absorption peak value.

In an embodiment, the photoacoustic gas sensor device is used as a $CO_2$ sensor. In that case, the band of infrared radiation is centered around a wavelength of 4.3 μm. Preferably the band has a full width at half maximum of below 0.5 μm, which may be understood as a narrow band. A narrowband source may e.g. comprise a meta-surface resonator, and may be embodied as an LED, for example. In another embodiment, the electromagnetic radiation source comprises a broadband emitter covered by a wavelength-selective bandpass filter configured to filter out electromagnetic radiation outside the band. The broadband emitter is defined as emitting radiation of a wide spectrum, such as across the entire infrared spectrum, or e.g. between 0.8 μm and 10 μm. Such broadband emitter may specifically be an infrared emitter such as a heater.

In an embodiment, the photoacoustic sensor device further comprises an integrated circuit, also known as chip, and in particular an ASIC, which preferably includes the functionality of a controller for the photoacoustic sensing, configured to control the electromagnetic radiation source. The integrated circuit preferably is arranged on the front side of the substrate. The integrated circuit preferably is configured to control an intensity of the electromagnetic radiation to modulate with the modulation frequency. The modulation frequency is between 1 Hz and 100 kHz, preferably between 10 Hz and 200 Hz, more preferably between 20 Hz and 60 Hz, e.g. 40 Hz, and in particular a heater, if applicable, of the electromagnetic radiation source is switched with the modulation frequency. Low modulation frequencies of <100 Hz are advantageous for generating large photoacoustic signals.

Preferably the integrated circuit is configured to receive a measurement signal from the pressure transducer and to determine the value indicative of a presence or a concentration of the component dependent on the measurement signal, preferably including signal processing such as linearization and/or compensation. In particular the value is determined dependent on an amplitude of the measurement signal, e.g. a loudness in the case of a sound wave. Preferably the measurement signal is bandpass-filtered around the modulation frequency. This increases a robustness of the determination since sound waves with other frequencies are not taken into account.

In an embodiment, the photoacoustic sensor device further comprises another transducer for sensing one or more of temperature, humidity, pressure and different components in the gas. Accordingly, the other transducer may be embodied as one or more of a pressure sensor, a barometric pressure sensor, another microphone, another gas sensor, e.g. of metal oxide type or of electrochemical type. The other transducer may be arranged on or integrated in the front side of the substrate. Preferably, the other transducer is located inside the measurement cell. In the presence of the other transducer, the integrated circuit is preferably configured to compensate the value indicative of a presence or a concentration of the component dependent on measurement values of the other transducer. Hence effects of ambient conditions on the measurement of the component can be reduced or eliminated. Such compensation makes a resulting concentration value more accurate and reliable, or in other words, the gas sensor device may be applied in varying environment conditions.

Preferably, all electrical and electronic components of the photoacoustic sensor device, collectively referred to as electrical components, are mounted on the front side of the substrate, and preferably are arranged in the measurement cell. At least the pressure transducer, the electromagnetic radiation source, and possibly the measurement cell body are surface mounted on the front side of the substrate. Preferably, all electrical components are surface mounted on the front side of the substrate such that the photoacoustic gas sensor device is an SMD (surface mounted device).

Preferably, the back side of the substrate only includes contacts for electrically connecting the photoacoustic gas sensor device to a carrier. In an embodiment, the contacts include land grid array (LGA) pads arranged for SMD assembly and/or reflow soldering. This facilitates an assembly of the device with other components by the customer. Other choices of contacts may include DFN, QFN or castellated holes.

In a preferred embodiment, a reflective shield is provided dividing the measurement volume into a first volume and a second volume. The pressure transducer as well as the electromagnetic radiation source are preferably arranged in the first volume on the front side of the substrate. Although the actual photoacoustic conversion mainly takes place in the second volume in such arrangement, a combination of the first and the second volume still is legitimate to refer to as measurement volume given that the pressure transducer as measuring entity is located in the first volume. The reflective shield preferably comprises an aperture through which electromagnetic radiation generated by the electromagnetic radiation source is transmitted into the second volume, which aperture preferably is a single aperture. Hence, dividing the measurement volume into a first and a second volume does not imply two volumes sealed from each other. In contrast, the second volume is communicatively coupled to the first volume and specifically to the pressure transducer arranged therein. This enables the pressure transducer to detect sound variations caused by the absorption of the electromagnetic radiation by the components of interest in the first volume. Hence, the communicative coupling preferably is an acoustic coupling, and preferably includes that pressure changes in the second volume are detectable by the pressure transducer arranged in the first volume. The acoustic coupling may in one embodiment be effected by the single aperture in the reflective shield.

At least a portion of a surface of the reflective shield facing the second volume is made of a material reflecting electromagnetic radiation, and in particular reflecting the electromagnetic radiation of the specific wavelength or wavelength band emitted by the electromagnetic radiation source. The wavelength or wavelength band of the radiation emitted preferably coincides or includes the wavelength or wavelength band the component in the gas is prone to absorb.

For the above purpose of providing good reflectivity characteristics in the second volume, it is preferred that at least the major portion of the surface of the reflective shield facing the second volume is made of the reflective material, i.e. at least 50% of this surface. However, with the intent to further increase the reflectivity in the second volume, it is even more preferred that the entire surface of the reflective shield facing the second volume is made of the reflective material. Preferably, it is intended to maximize surfaces defining the second volume with reflective material. As to the material providing the reflective properties, it is referred to the materials listed for the reflective properties of the measurement cell body.

Accordingly, the second volume is designed to provide characteristics that best enable a reflection of the emitted radiation. The electrical components including the pressure transducer and the electromagnetic radiation source are physically separated from the second volume which predominantly serves as space for enabling the photoacoustic conversion. Hence, any non-reflecting surfaces of the electrical components no longer affect the pathways of the radiation, and hence do not disturb the photoacoustic reactions or lower the sensitivity of the measurement signal. Furthermore, a high reflectivity of the inner surfaces of the measurement cell reduces an offset of the pressure signal, which is generated by the photoacoustic effect occurring in solid matter, e.g. on the surface of the measurement cell body.

Preferably, a thickness of the reflective shield is between 30 µm and 1 mm, in particular between 50 µm and 200 µm. Such thickness does not affect the dimensions of the photoacoustic sensor device too much, which dimensions are desired to be kept small.

Preferably, a ratio of the second volume to the first volume is at least 1.5, preferably at least 2, preferably at least 3, preferably at least 5. Such ratios are preferred in that the photoacoustic effect predominantly takes place in the second volume given that only the second volume is radiated. On the other hand, a large first volume would lower the pressure variations which would result in a less significant signal supplied by the pressure transducer. In addition, a large first volume would affect the diffusion of the gas into the second volume substantially provided the gas enters the first volume through a corresponding opening.

Preferably, the gas permeable area is provided in a portion of the measurement cell defining the first volume. This arrangement of gas permeable area provides for less critical exposure of the porous gas permeable membrane as non-reflecting surface to the electromagnetic radiation given that a vast majority of the electromagnetic radiation is reflected within the second volume instead of the first volume. This improves the average reflectivity in the measurement cell which in turn increases absorption of reflected light/radiation by the gas component such as $CO_2$.

In one embodiment, a plane extension of the reflective shield and a plane extension of the substrate are aligned in parallel with each other. The aperture in the reflective shield preferably is in vertical alignment with the electromagnetic radiation source arranged on the substrate, and in particular is in vertical alignment with its active area. The electromagnetic radiation source and the pressure transducer face the reflective shield.

In an embodiment, in addition to the pressure transducer and the electromagnetic radiation source, the integrated circuit and/or the other transducer if any are also arranged on the front side of the substrate in the first volume, and preferably face the reflective shield. In another embodiment, all electrical components are arranged in the first volume, and preferably face the reflective shield.

Preferably the measurement cell body and the substrate are connected in a gas tight manner, e.g. by gluing or soldering. Advantageously the measurement cell is acoustically tight except for the gas permeable area if any for the gas to enter. In a preferred embodiment, the measurement cell body is mounted to the substrate by means of a snap fit. Preferably, the measurement cell body comprises one or more snap arms and the substrate comprises one or more corresponding holes for the one or more snap arms to reach through. Preferably, the snap fit is designed to mount the measurement cell body acoustically tight to the substrate.

It is understood that all embodiments of the first aspect shall be disclosed also in combination with the second and third aspect of the present invention, if applicable.

BRIEF DESCRIPTION OF THE DRAWINGS

Embodiments of the present invention, aspects and advantages will become apparent from the following detailed description thereof. The detailed description makes reference to the annexed drawings, wherein the figures show.

DETAILED DESCRIPTION OF THE DRAWINGS

Figure 1:
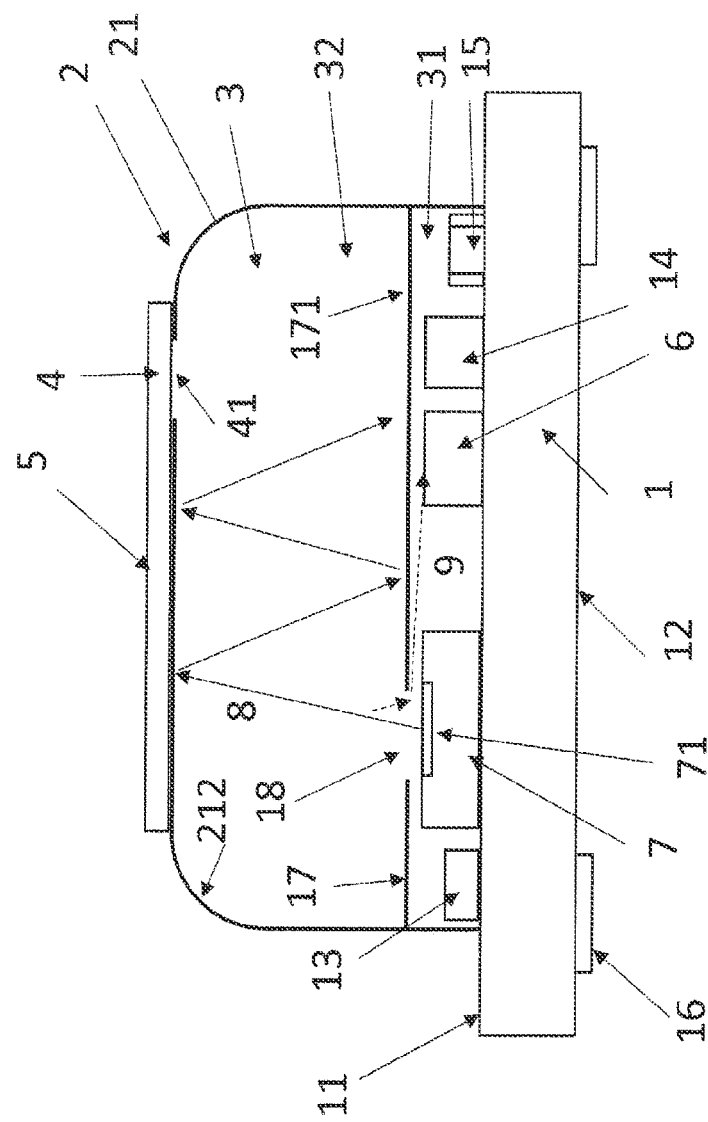
FIG. 1 to FIG. 3 and FIG. 7 to FIG. 9, each, a cut view of a photoacoustic gas sensor device comprising a membrane, according to embodiments of the invention, FIG. 4 to FIG. 6, each, a membrane arrangement as used in a photoacoustic gas sensor device according to an embodiment of the invention, in diagrams a) in top view, in diagrams b) in cut view, FIG. 10 a cut view of a photoacoustic gas sensor device comprising holes, according to an embodiment of the invention, and FIG. 11 a diagram illustrating the impact of varying different parameters of the hole solution as e.g. applied in the embodiment of FIG. 10.

Same elements are referred to by same reference numerals across all figures.

FIG. 1 shows a schematic cut view of a photoacoustic gas sensor device according to an embodiment of the present invention.

The device comprises a substrate 1, e.g. a printed circuit board (PCB), with a front side 11 and a back side 12 opposite the front side 11. A measurement cell body 21 is mounted on the front side 11 of the substrate 1, which substrate 1 and measurement cell body 21 together form a measurement cell 2 enclosing a measurement volume 3. The measurement cell 2 comprises a gas permeable area 4 comprising an opening 41 in the measurement cell body 21 covered by a porous gas permeable membrane 5 to allow an exchange of gas between the measurement volume 3 and surroundings of the device, and in particular to allow a gas to be measured to enter the measurement volume 3, such that a concentration of the component of interest in the gas in the measurement volume 3 is similar as in the surroundings.

A pressure transducer 6 such as a MEMS microphone or a pressure sensor, and an electromagnetic radiation source 7, which in this example is an infrared source, are both located on the front side 11 of the substrate 1 inside the measurement cell 2. The electromagnetic radiation source 7 includes an active area 71 emitting the electromagnetic radiation, i.e. the infrared radiation in this example, indicated by arrows 8. The infrared source emits infrared radiation of the band, wherein the intensity of the infrared radiation is modulated as described above. The infrared radiation is selectively absorbed by molecules of the gas component of interest.

In the present embodiment, a reflective shield 17 is provided in the measurement cell 2. The reflective shield 17 presently extends in a plane parallel to a planar extension of the substrate 1. The reflective shield 17 is attached to or formed integrally with the measurement cell body 21. The reflective shield 17 divides the measurement volume 3 into a first volume 31 between the substrate 1 and the shield 17, and a second volume 32 between the shield 17 and the measurement cell body 2. The reflective shield 17 comprises an aperture 18 which presently is aligned with the infrared source 7, such that infrared radiation 8 can emit from the infrared source 7 through the aperture 18 into the second volume 32.

It is preferred that a surface 171 of the shield 17 facing the second volume 32 is made of a material reflecting the electromagnetic radiation emitted by the electromagnetic radiation source 7. This is indicated by the various arrows representing the electromagnetic radiation 8 reflected in the second volume 32 after being emitted from the infrared source 7. A ratio of infrared radiation 8 absorbed is increased by increasing a mean optical path length of the infrared radiation 8 within the measurement volume 3. This is achieved by a material of at least the inner surface 212 of the measurement cell body 21 being chosen to be reflective. In case of a coating, the reflective coating may be made from a metal such as gold, aluminum, nickel, copper. In this way, the overall reflectivity inside the second volume 32 is increased, which leads to more accurate measurements of the concentration of the component. The increase of the mean optical path length, in particular in contrast to the linear optical path in conventional photoacoustic gas sensors, is illustrated by multiple reflections of the infrared radiation 8 in the various Figures. Here, the photoacoustic effect comes into play: Molecules of the gas component of interest, e.g. $CO_2$, absorb the electromagnetic radiation in the second volume 32 leading to the generation of heat and hence an increase of pressure. By modulating an intensity of the electromagnetic radiation with a modulation frequency in the infrared source 7, a modulation of pressure may be achieved.

Such pressure modulation or pressure variations, i.e. sound waves, may be measured by the pressure transducer 6. In this example, the aperture 18 in the reflective shield 17 allows such sound waves generated in the second volume 32 to reach into the first volume 31 and hence to reach the pressure transducer 6. For this reason, a gap is provided between the reflective shield 17 and the electromagnetic radiation source 7. The sound waves are indicated by reference numeral 9 in FIG. 1. Accordingly by means of the aperture 18 in the shield 17, the second volume 32, in which the absorption and sound wave generation predominantly takes place, is communicatively coupled to the first volume 31 and the pressure transducer 6. Accordingly, in the present example, not only the electromagnetic radiation enters the second volume 32 through the aperture 18, but also the sound waves propagate from the second volume 32 into the first volume 31 to the pressure transducer 6.

While in a different embodiment, the reflective shield may be mounted to the substrate 1, in a further embodiment no such reflective 17 shield is provided at all and the measurement volume 3 is uniform.

In addition to the electromagnetic radiation source 7 and the pressure transducer 6, additional components are arranged on the front side 11 of the substrate 1 inside the measurement cell 2. These components include an integrated circuit 14, e.g. an ASIC, which preferably is configured to control the electromagnetic radiation source 7, e.g. by imposing an intensity modulation on e.g. the infrared radiation emitted with a modulation frequency. The modulation frequency may be within the audible spectrum, e.g. between 20 Hz and 20 kHz, or it may be up to 100 kHz, or it may even be down to 5 Hz. The integrated circuit 14 is further configured to receive measurement values from the pressure transducer 6, as well as for determining a value of the gas component concentration from those measurement values, e.g. by using a predefined or a resettable calibration function linking the measurement values to concentration value of the gas component. The value of the gas component concentration may be output via a digital interface, e.g. an I2C interface, as may be values of one or more other transducers if any.

In the present example, another transducer 13 is arranged on the front side 11 of the substrate 1 inside the measurement cell 2, which other transducer 13 advantageously is one or more of the following: a temperature sensor, a humidity sensor, a combined temperature/humidity sensor, a pressure sensor, in particular a barometric pressure sensor, another microphone, another gas sensor, e.g. of metal oxide type or of electrochemical type. Through measurement values of temperature and/or humidity and/or any of the other parameters measured by such other transducer, a gas concentration value may be compensated, e.g. for effects of temperature and/or humidity, e.g. by the integrated circuit 14. Hence, effects of ambient conditions on the measurement of the component can be reduced or eliminated.

Further electrical components 15 may be arranged on the front side 11 of the substrate 1 inside the measurement cell 2, which further electrical components 15 may include passive components or auxiliary electronics, e.g. capacitors and resistors, as required.

On the back side 12 of the substrate 1, land grid array (LGA) pads 16 are arranged for SMD assembly and reflow soldering by a customer. Other contacts such as DFN, QFN or castellated holes are possible.

In one example, the component to be measured is $CO_2$. For $CO_2$, measurements in the range between 0 and 10'000 ppm, or between 0 and 40'000 ppm, or between 0 and 60'000 ppm $CO_2$ are possible.

The proposed photoacoustic gas sensor device, as e.g. shown in FIG. 1, may be built with a small form factor, such that the measurement cell has an overall size of 0.2 cm³. Thus it is significantly smaller and also cheaper to manufacture than conventional photoacoustic or NDIR-based gas sensors.

Figure 2:
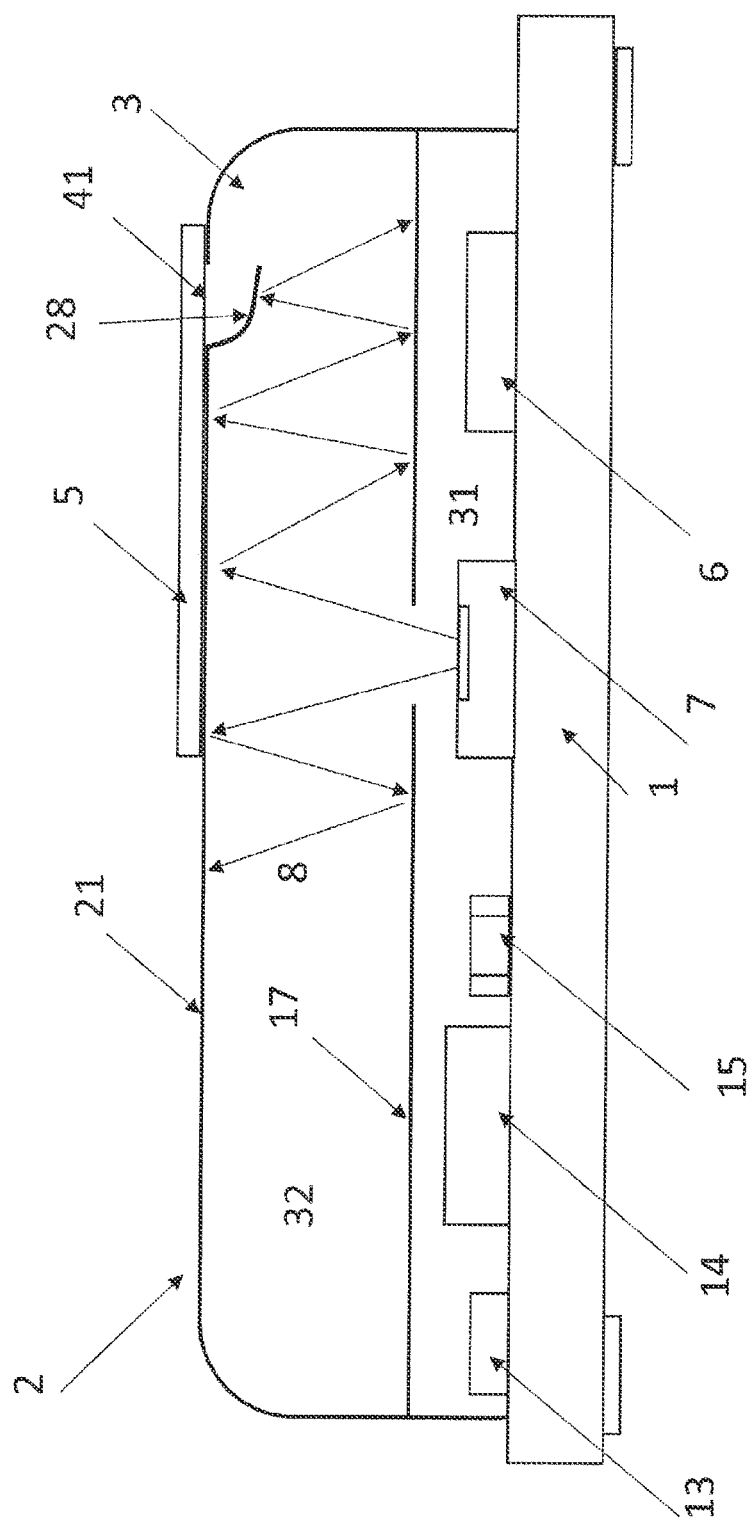

FIG. 2 illustrates a cut view of another photoacoustic gas sensor device comprising a membrane 5, according to an embodiment of the invention. Some of the reference signs of FIG. 1 are omitted for illustration purposes. In comparison to the embodiment of FIG. 1, the porous gas permeable membrane 5 now is at least partly shielded from the inside. For this purpose, a reflector 28 is arranged inside the measurement cell 2. At least a portion of the reflector 28 is spaced from the opening 41. The reflector 28 is arranged and configured to reflect electromagnetic radiation back into the measurement volume 3 which otherwise would be absorbed by the porous gas permeable membrane 5 or transmitted there through. This function is indicated by the arrows 8 representing the electromagnetic radiation which in the region of the opening 41 is reflected by the reflector 28. A surface of the reflector 28 facing the measurement volume 3 is of reflective property for the electromagnetic radiation 8.

In the present example, the reflector 28 is formed integrally as one piece with the measurement cell body 21. It is assumed that the inside of the measurement cell body 21 is either made from or coated with a reflecting material. The reflector 28 may be manufactured by cutting or punching a tongue or flap into the measurement cell body 21 at a location desired for the opening 41. The flap or tongue remains connected with the rest of the measurement cell body 21 and is pressed towards the interior of the measurement cell 2.

Figure 3:
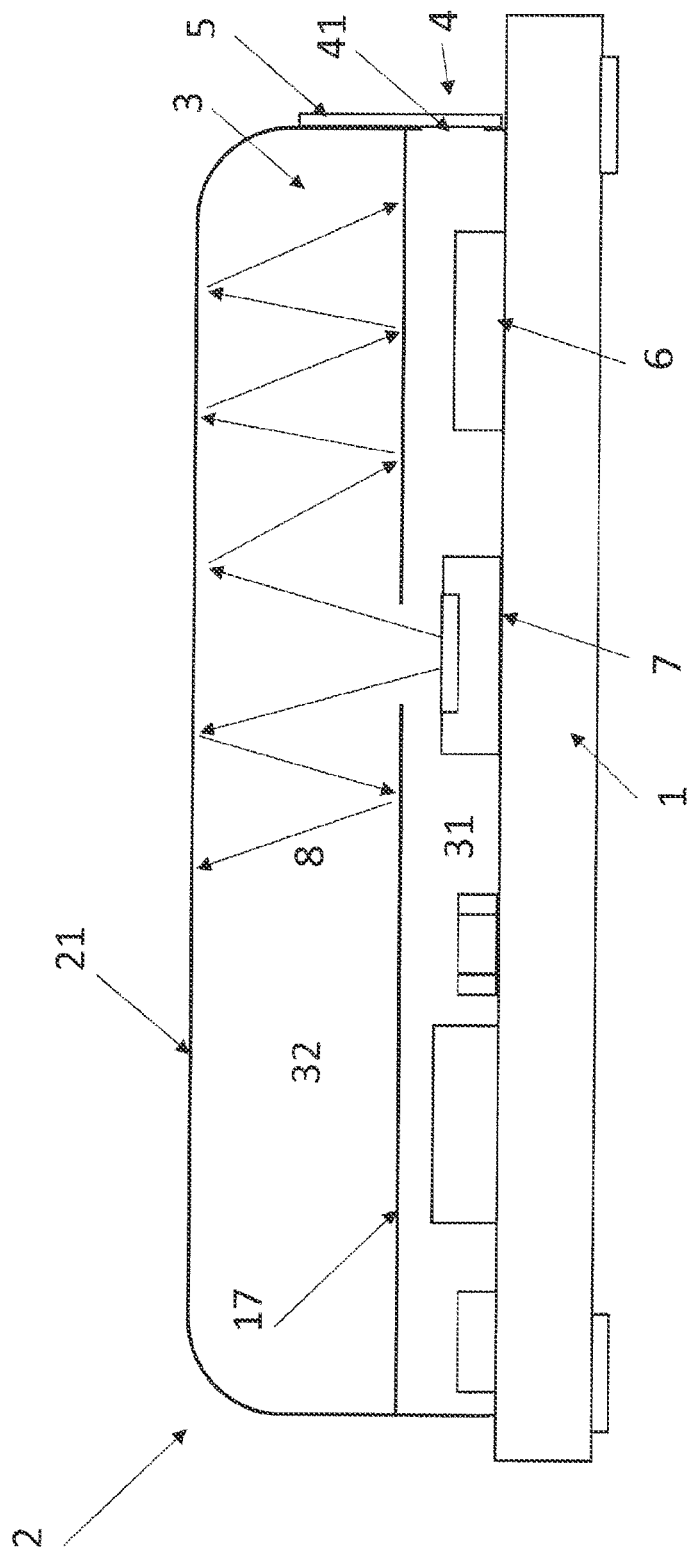

The embodiment of FIG. 3 differs from the embodiment of FIG. 1 in a different location for the opening 41 in the measurement cell 2. The gas permeable area 4, and hence the opening 41 still is arranged in the measurement cell body 21. However, instead of being arranged at a top of the measurement cell body 2 as in FIGS. 1 and 2, it is now arranged laterally in a side wall. In addition, the opening 41 now provides access to the first volume 31 instead of the second volume 32. Again, the opening 41 is covered by the porous gas permeable membrane 5.

In this arrangement the membrane 5 as non-reflecting surface is less exposed to the electromagnetic radiation 8 given that a vast majority of the electromagnetic radiation 8 is emitted into and reflected in the second volume 32. This improves the average reflectivity in the measurement cell 2 which in turn increases absorption of reflected light/radiation by the gas component such as CO2. Means for improving the reflectivity such as the reflector 28 from FIG. 2 may be avoided. In addition, undesired photoacoustic reactions at a surface of the membrane 5 are reduced or avoided, too.

Flexion or buckling of the porous gas permeable membrane may not be desired as adversely impacting the measurement. Each of the FIGS. 4 to 6 illustrates means for improving a mechanical stability of the porous gas permeable membrane, in diagram a) in a top view of a membrane arrangement as used in a photoacoustic gas sensor device according to an embodiment of the invention, and in diagram b) a cut view along line A-A'.

FIG. 4 illustrates a porous gas permeable membrane 5 attached to a measurement cell body 21 or a substrate 1, preferably from the outside. The opening 41 in the measurement cell body 21 is covered by the porous gas permeable membrane 5, a size of which extends the opening 41 in order to provide sufficient material to attach the porous gas permeable membrane 5 to the measurement cell body 21. In the present example, the shape of the porous gas permeable membrane 5 is square, while the opening 41 is circular. The attachment is accomplished by an adhesive layer which at the same time serves as a support layer 51. The support layer 51 preferably is structured to comprise holes 511. Then, the support layer 51 is preferably applied to the porous gas permeable membrane 5. In view of the support layer 51 preferably being gas tight, the holes 511 allow gas passing the porous gas permeable membrane 5 to enter the measurement volume 3 through the opening 41. Accordingly the adhesive support layer 51 not only serves for attaching the porous gas permeable membrane 5 to the measurement cell body 21 or the substrate 1, but also serves as its mechanical support and hence prevents flexure and buckling. The adhesive support layer 51 preferably is hardened or annealed for providing the sufficient rigidness and adhesion.

FIG. 5 illustrates another variant. Again, a porous gas permeable membrane 5 is attached to a measurement cell body 21 or a substrate 1, preferably from the outside. Again, the opening 41 in the measurement cell body 21 or substrate 1 is covered by the porous gas permeable membrane 5, a size of which extends the opening 41 in order to provide sufficient material to attach the porous gas permeable membrane 5 to the measurement cell body 21 or substrate 1. The attachment again is accomplished by means of an adhesive, now referred to by 53. However, this time the adhesive 53 does not additionally act as support for the porous gas permeable membrane 5 and only is applied to a rim section of the porous gas permeable membrane 5 by which it is attached to the measurement cell body 2 or substrate 1. Instead, a lattice structure 54 provides mechanical stability and is attached to a first side of the porous gas permeable membrane 5 that faces the outside of the device. For manufacturing this arrangement, it is preferred that first the lattice structure 54 is attached to the porous gas permeable membrane 5 while this combination then is attached to the measurement cell body 21 or substrate 1 by means of the adhesive 53. It is noted that for illustration purposes, the lattice period in diagram b) does not match the lattice period shown in diagram a).

In the embodiment of FIG. 6, the previously single opening 41 now is replaced and represented by multiple bores 411 or openings in the measurement cell body 21 or substrate 1. The porous gas permeable membrane 5 is attached to the measurement cell body 21, e.g. by means of an adhesive not shown and covers the multiple bores 411. In this example, the multiple smaller bores prevent buckling or flapping of the porous gas permeable membrane 5 in view of multiple smaller bore diameters to be spanned instead of one large one.

Figure 7:
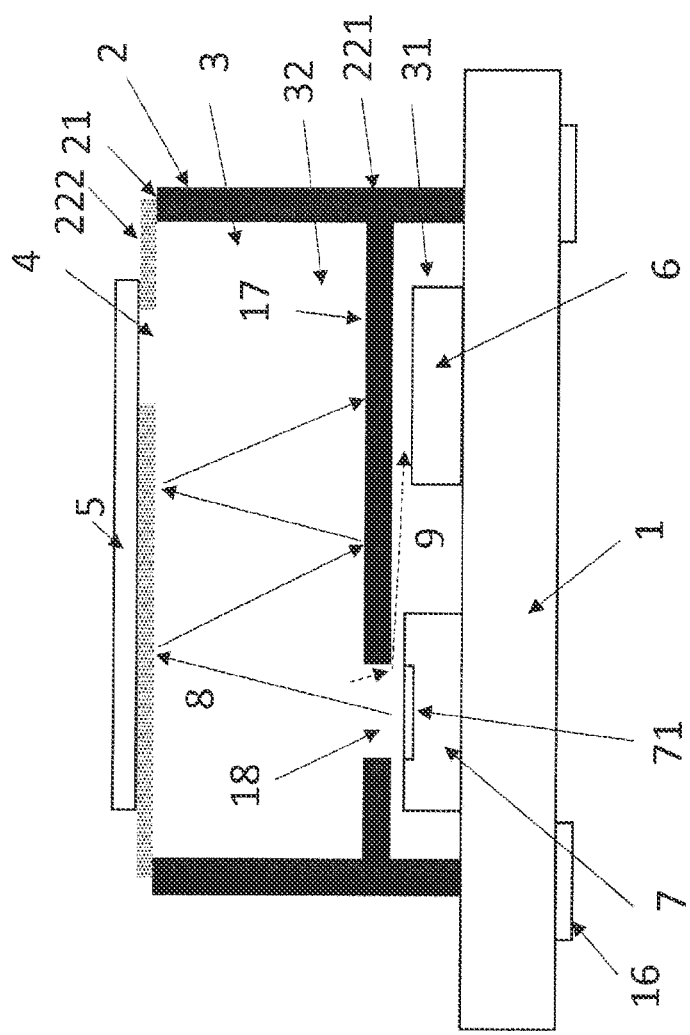

FIG. 7 again shows a cut view of a photoacoustic gas sensor device comprising a membrane, according to an embodiment of the invention. In this embodiment, the reflective shield 17 is formed integrally with the measurement cell body 2. Here, the measurement cell body 21 comprises a frame 221 and a lid 222 acting as a cover. The opening 41 now is provided in the lid 222 and the porous gas permeable membrane 5 is attached to a top side of the lid 222 facing the surroundings. In this embodiment, the frame 221, the lid 222 and the reflective shield 17 if any may all be made from the reflective material, e.g. from metal. However, in a different embodiment, one or more of the frame 221, the lid 222 and the reflective shield 17 if any may comprise a plastic core, and a reflective coating where desired. The integrated circuit 14, the one or more other transducers 13, and any further electrical components 15 known from the embodiment of FIG. 1 are omitted for illustration purposes.

Figure 8:
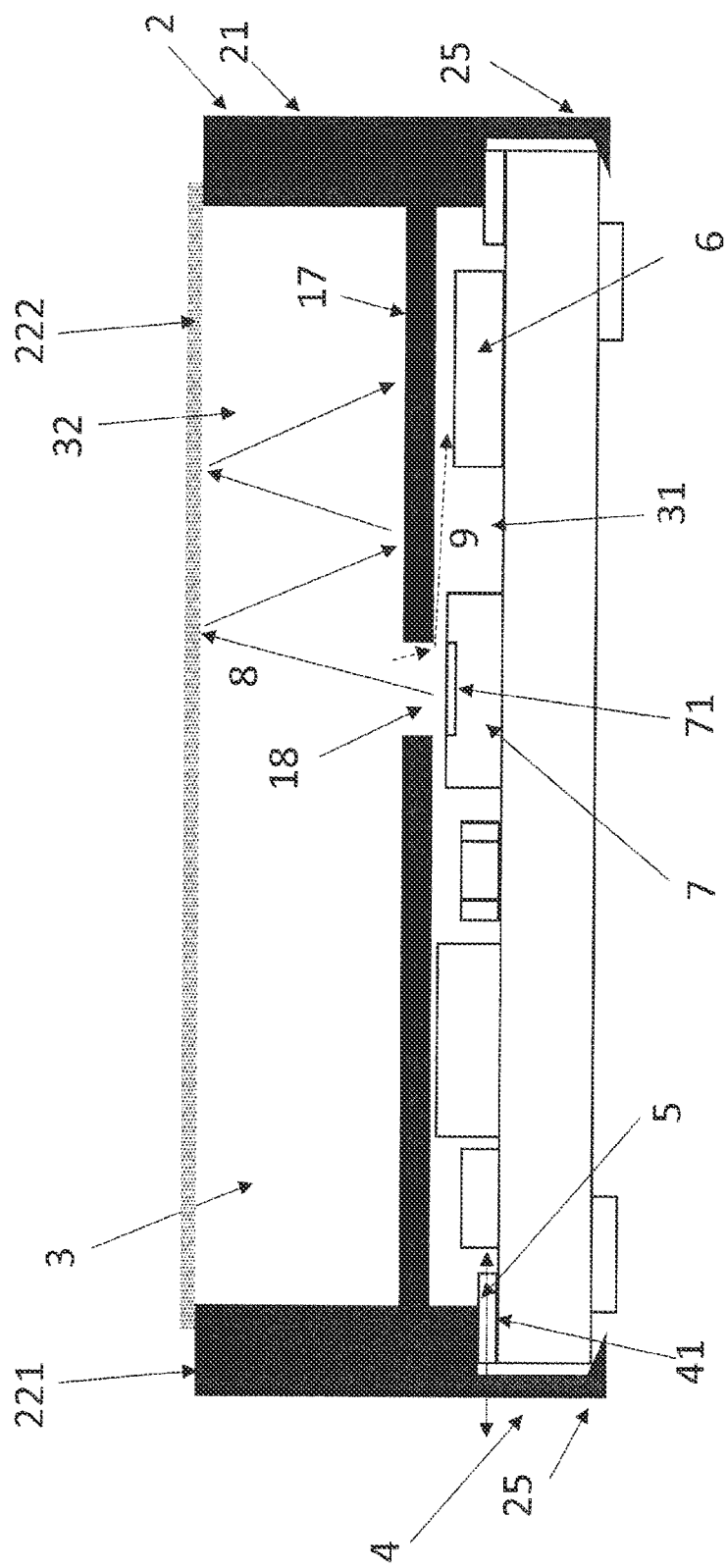

The embodiment of FIG. 8 differs from the embodiment of FIG. 1 in that the gas permeable area 4 now is provided between the substrate 1 and the measurement cell body 21. Owed to the construction of the measurement cell body 21, and specifically the frame 221 thereof, when clipping the frame 221 to the substrate 1, a horizontal opening 41 is generated between the front side 11 of the substrate 1 and a bottom surface of the frame 221. This opening 41 preferably takes the shape of a ring around the measurement volume 3 and is filled by e.g. a ring of porous gas permeable membrane material. Accordingly, the gas to be measured enters the measurement volume 3 laterally through the opening 41 between the measurement cell body 21 and the substrate 1, and diffuses from the first volume 31 through the aperture 18 into the second volume 32 where it meets the electromagnetic radiation 8. This process is indicated in FIG. 8 by the dotted arrow. In this embodiment, the lid 222 is understood to seal the measurement volume 3 from the top. In this embodiment, the footprint of the substrate 1 matches the footprint of the measurement cell body 2 such that snap fits 25 can be used for easily attaching the measurement cell body 2 to the substrate 1.

Figure 9:
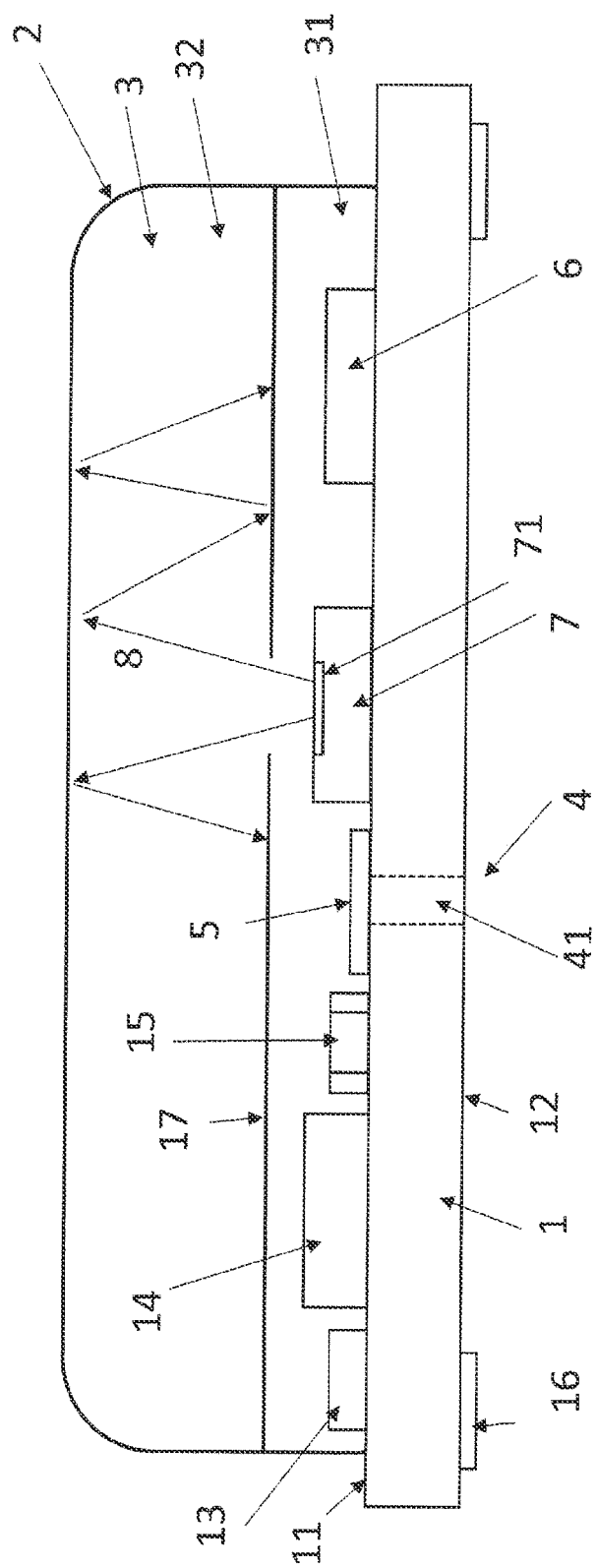

The embodiment of FIG. 9 resembles the embodiment of FIG. 1. However, the gas permeable area 4 now is located in the substrate 1 in form of a through-hole opening 41 in the substrate 1. Accordingly, the gas to be measured enters the measurement volume 3 through the opening 41 in the substrate 1, and diffuses from the first volume 31 through the aperture 18 into the second volume 32 where it meets the electromagnetic radiation 8. The porous gas permeable membrane 5 now is attached to the substrate 1, and preferably is attached to the front side 11 of the substrate 1 facing the first volume 31. In a different embodiment, the porous gas permeable membrane 5 is attached to the back side 12 of the substrate 1.

Figure 10:
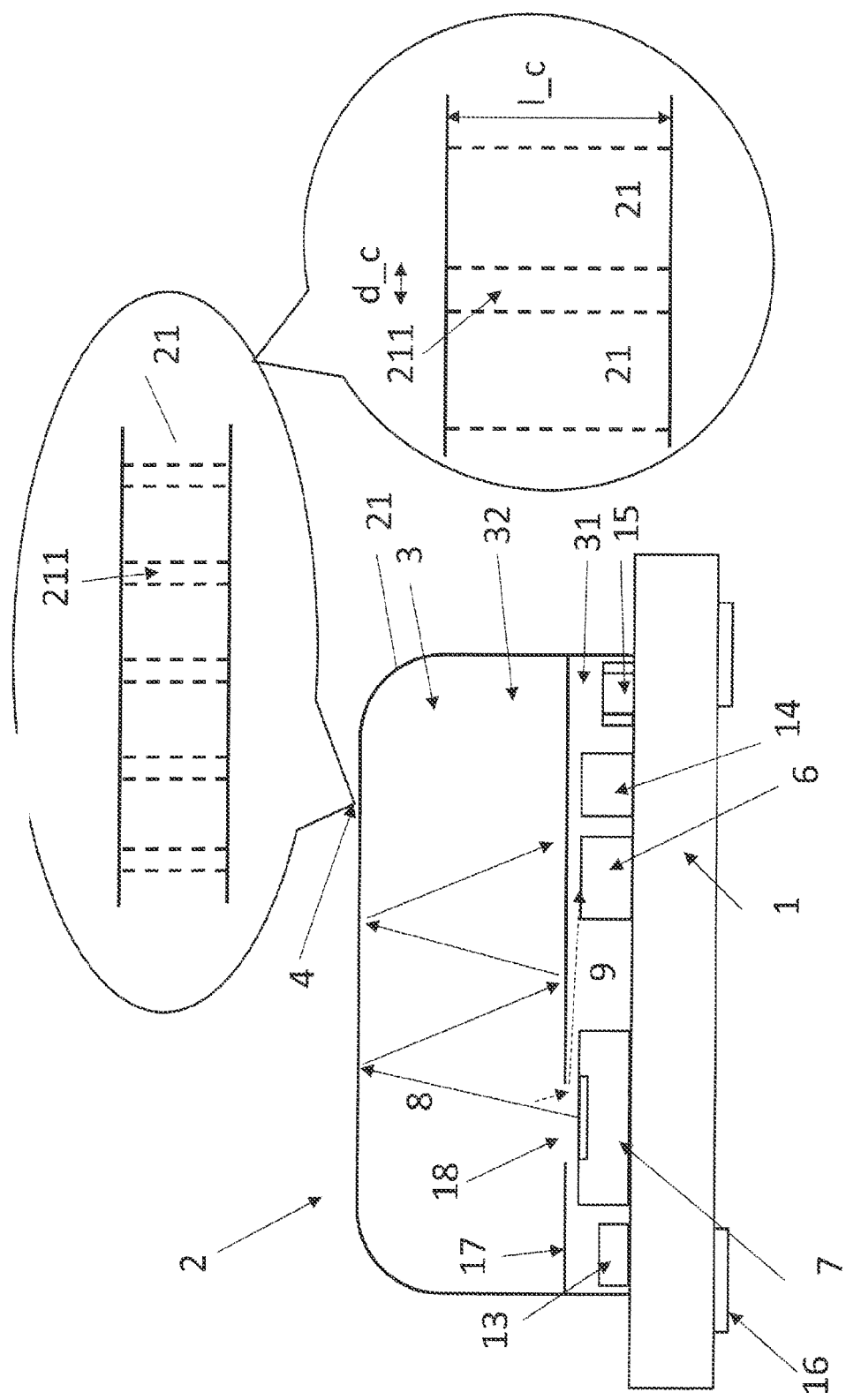

FIG. 10 illustrates a cut view of a photoacoustic gas sensor device according to an embodiment of the invention, now comprising holes 211 instead of a porous gas permeable membrane. Accordingly, the gas permeable area 4 in this embodiment is represented by an area of the measurement cell 2, and here specifically of the measurement cell body 21, containing holes 211 reaching through a wall of the measurement cell body 21 made from an otherwise gas tight material. A diameter $d\_c$ of the holes 211 is between 100 nm and 10 μm. A length $l\_c$ of the holes 211 is between 1 μm and 1000 μm. The dimension $l\_h$ at the same time represents a thickness of the measurement cell body 21 at least in the gas permeable area 4. A number of the holes 211 is between 50 and 15000. Zoomed in views illustrate portions of the gas permeable area 4 in more detail.

Figure 11:
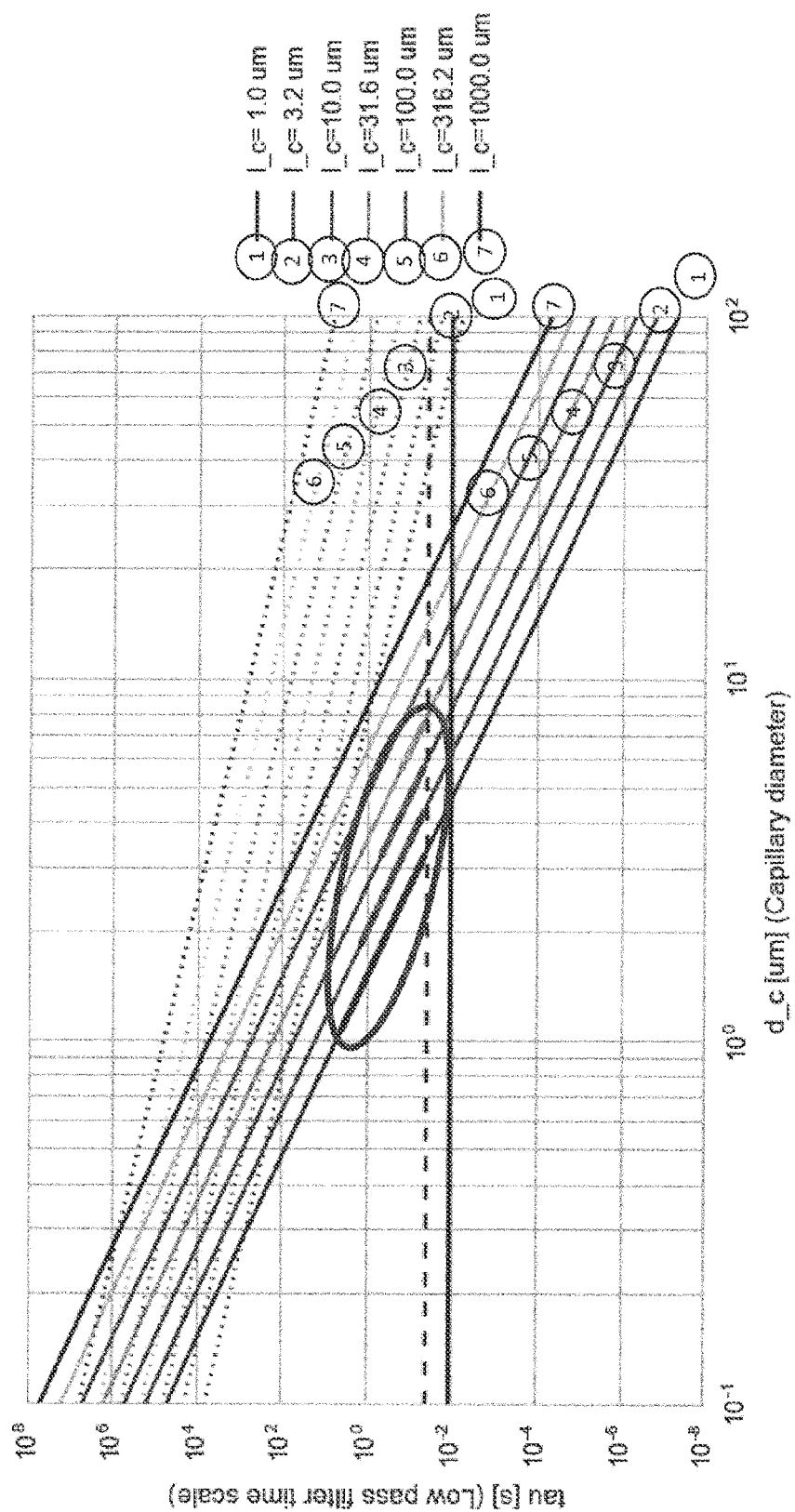

In the diagram of FIG. 11 the impact of different parameters related to holes are illustrated, as e.g. applicable in the embodiment shown in FIG. 10. In the present example, a number of 100 holes present in the measurement cell 2 and representing a gas permeable area shall be investigated as to attenuation and diffusion. The x-axis represents varying diameters $d\_c$ in μm of the holes under the assumption that diameters and length of the holes are uniform across all 100 holes. The y-axis denotes a time constant τ in seconds representing a low pass filter time constant. The graphs each depict the time constant τ over hole diameter $d\_c$ for a given length $l\_c$ of the holes. While the dotted graphs show the time constant τ for diffusion processes through the holes, the straight graphs denote the time constant of the low pass filter referring to attenuation. A selection of applicable dimensions of the holes, i.e. hole diameter $d\_c$ and hole length $l\_c$ may be achieved as follows: A diffusion time τ of max 60 sec is considered as acceptable, whereas an aspect ratio of hole length $l\_c$ over hole diameter $d\_c$ of at most 20 is considered as acceptable from a manufacturing point of view. From the attenuation point of view represented by the time constant of the low pass filter for the straight lines, a rather low time constant is desired for having higher frequency pressure variations being filtered by the collective holes. On the other hand, a minimum time constant for the low pass filter is considered in the range of 0.1 s represented by the dashed bold horizontal line. These selections lead to a preferred range of hole diameters $d\_c$ shown for each hole length $l\_c$ in the reinforced, bold section of the straight lines. The ellipse encircles the range of hole diameter $d\_c$ versus hole length l_c which combination of dimensions result, for the number of 100 holes, in both desired diffusion and attenuation characteristics.

While above there are shown and described embodiments of the invention, it is to be understood that the invention is not limited thereto but may be otherwise variously embodied and practiced within the scope of the following claims.

The invention claimed is:

1. A photoacoustic gas sensor device, for determining a value indicative of a presence or a concentration of a component in a gas, the photoacoustic gas sensor device comprising:
   a measurement cell enclosing a measurement volume;
   a gas permeable area in the measurement cell for a gas to enter the measurement volume;
   an electromagnetic radiation source arranged to emit electromagnetic radiation into the measurement volume; and
   a pressure transducer arranged to measure a sound wave generated by the component in response to an absorption of electromagnetic radiation by the component in the measurement volume,
   wherein the gas permeable area is represented by a porous gas permeable membrane,
   wherein an average pore size of the porous gas permeable membrane is between 10 nm and 1 μm, or between 20 nm and 200 nm,
   wherein a porosity of the porous gas permeable membrane is between 20% and 90%,
   wherein a dimension of the measurement volume is between 0.03 cm$^3$ and 8 cm$^3$, and
   wherein a diameter of the gas permeable area is between 0.2 mm and 4 mm.

2. The photoacoustic gas sensor device according to claim 1, wherein the porosity of the porous gas permeable membrane is between 20% and 50%.

3. The photoacoustic gas sensor device according to claim 1,
   wherein the dimension of the measurement volume is between 0.08 cm$^3$ and 1 cm$^3$, or is 0.2 cm$^3$, and
   wherein a diameter of the gas permeable area is between 0.5 mm and 2 mm.

4. The photoacoustic gas sensor device according to claim 1,
   wherein the porous gas permeable membrane comprises or consists of one of a sintered metal, a ceramic, a polymer such as PTFE, and
   wherein a thickness of the porous gas permeable membrane is between 50 μm and 400 μm, or between 100 μm and 300 μm.

5. The photoacoustic gas sensor device according to claim 1, comprising
   a substrate; and
   a measurement cell body, the substrate and the measurement cell body defining the measurement volume,
   wherein the measurement cell body, the substrate and other components defining the measurement volume if any are made from a gas tight material and are assembled in a gas tight manner,
   wherein the measurement cell body comprises an opening,
   wherein the opening is covered by the porous gas permeable membrane, and
   wherein the porous gas permeable membrane is attached to the measurement cell body, in particular by one of gluing, injecting, casting, soldering and welding.

6. The photoacoustic gas sensor device according to claim 5,
   wherein the opening is represented by multiple bores in one or more of the measurement cell body and the substrate,
   wherein the porous gas permeable membrane is attached to the measurement cell body or the substrate respectively to cover the multiple bores.

7. The photoacoustic gas sensor device according to claim 5,
   comprising a reflector arranged inside the measurement cell and spaced from the opening, for reflecting electromagnetic radiation back in the measurement volume otherwise absorbed by or transmitted through the porous gas permeable membrane.

8. The photoacoustic gas sensor device according to claim 1,
   a substrate; and
   a measurement cell body, the substrate and the measurement cell body defining the measurement volume,
   wherein the measurement cell body, the substrate and other components defining the measurement volume if any are made from a gas tight material and are assembled in a gas tight manner,
   wherein the substrate comprises an opening,
   wherein the opening is covered by the porous gas permeable membrane, and
   wherein the porous gas permeable membrane (5) is attached to the.

9. The photoacoustic gas sensor device according to claim 1, comprising
   a substrate; and
   a measurement cell body, the substrate and the measurement cell body defining the measurement volume,
   wherein the measurement cell body, the substrate and other components defining the measurement volume if any are made from a gas tight material and are assembled in a gas tight manner except for an opening between the measurement cell body and the substrate,
   wherein the opening is covered by the porous gas permeable membrane, and
   wherein the porous gas permeable membrane is attached to one or more of the measurement cell body and the substrate.

10. The photoacoustic gas sensor device according to claim 1,
    comprising a support layer attached to the porous gas permeable membrane.

11. The photoacoustic gas sensor device according to claim 10, wherein the support layer is an adhesive layer and the porous gas permeable membrane is attached to the measurement cell by means of the adhesive layer, and/or
    wherein the support layer is gas tight and comprises one or more holes arranged to allow gas entering the measurement volume when passing the porous gas permeable membrane.

12. The photoacoustic gas sensor device according to claim 1, comprising
    a lattice structure attached to a first side of the porous gas permeable membrane,
    wherein the porous gas permeable membrane is attached to the measurement cell by means of an adhesive arranged on a second side of the porous gas permeable membrane opposite the first side.

13. The photoacoustic gas sensor device according to claim 1, wherein the electromagnetic radiation source and the pressure transducer are arranged in the measurement cell.

14. The Photoacoustic-photoacoustic gas sensor device according to claim 1, wherein the porous gas permeable membrane comprises a metallization soldered to the substrate.

15. A photoacoustic gas sensor device, for determining a value indicative of a presence or a concentration of a component in a gas, the photoacoustic gas sensor device comprising:
- a measurement cell enclosing a measurement volume;
- a gas permeable area in the measurement cell for a gas to enter the measurement volume;
- an electromagnetic radiation source arranged to emit electromagnetic radiation into the measurement volume; and
- a pressure transducer arranged to measure a sound wave generated by the component in response to an absorption of electromagnetic radiation by the component in the measurement volume,
- wherein the gas permeable area is represented by an area of the measurement cell containing holes reaching through an otherwise gas tight material of the measurement cell,
- wherein a diameter of the holes is between 100 nm and 10 µm,
- wherein a thickness of the material of the measurement cell defining the gas permeable area is between 1 µm and 1 mm, and
- wherein an aspect ratio of a hole length to the hole diameter is less than 20.

16. The photoacoustic gas sensor device according to claim 15,
- comprising a reflective shield dividing the measurement volume into a first volume and a second volume, wherein at least a portion of a surface of the reflective shield facing the second volume is made of a material reflecting electromagnetic radiation,
- wherein the electromagnetic radiation source is arranged in the first volume for emitting electromagnetic radiation through an aperture in the reflective shield into the second volume,
- wherein the pressure transducer is arranged in the first volume and is communicatively coupled to the second volume for measuring the sound wave generated by the component in response to an absorption of electromagnetic radiation by the component.

17. The photoacoustic gas sensor device according to claim 15,
- wherein the electromagnetic radiation source and the pressure transducer are arranged on a front side of the substrate facing the measurement volume, and/or
- wherein a ratio of the second volume to the first volume is at least 1.5, or at least 2, or at least 3, or at least 5, and/or
- wherein a thickness of the reflective shield is between 30 µm and 1 mm, in particular between 50 µm and 200 µm, and/or
- wherein the gas permeable area is provided in a portion of the measurement cell defining the first volume.

18. The photoacoustic gas sensor device according to claim 15, wherein the holes are capillaries.

19. A photoacoustic gas sensor device, for determining a value indicative of a presence or a concentration of a component in a gas, the photoacoustic gas sensor device comprising:
- a measurement cell enclosing a measurement volume;
- a gas permeable area in the measurement cell for a gas to enter the measurement volume;
- an electromagnetic radiation source arranged to emit electromagnetic radiation into the measurement volume; and
- a pressure transducer arranged to measure a sound wave generated by the component in response to an absorption of electromagnetic radiation by the component in the measurement volume,
- wherein the gas permeable area is represented by an area of the measurement cell containing holes reaching through an otherwise gas tight material of the measurement cell,
- wherein a diameter of the holes is between 100 nm and 10 µm, and
- wherein a number of the holes is between 50 and 200,000.

20. The photoacoustic gas sensor device according to claim 19, wherein the number of the holes is between 100 and 10,000.

* * * * *